Nov. 3, 1936.  J. KRUTTSCHNITT  2,059,368
AUTOMATIC CUTTER
Filed April 23, 1935

INVENTOR,
John Kruttschnitt
BY Booth & Booth
ATTORNEYS.

Patented Nov. 3, 1936

2,059,368

UNITED STATES PATENT OFFICE 2,059,368

AUTOMATIC CUTTER

John Kruttschnitt, San Mateo, Calif.

Application April 23, 1935, Serial No. 17,813

8 Claims. (Cl. 164—48)

The present invention relates to automatic mechanism for cutting off successive pieces of equal length from the end of a continuously advancing strip of material.

This application is a continuation in part of my copending application Serial No. 675,413, filed June 12th, 1933.

The principal object of the invention is to provide mechanism for making a clean and rapid transverse cut through an advancing strip of material. Another object is to provide means for retracting the cutting knives instantaneously to prevent them from impeding the continuous advance of the uncut portion of the strip. A further object is to provide a means for adjusting the length of the cut portions which does not necessitate changing the position of the cutting knives.

Still further objects of the invention will become apparent from the following description which should be read with the understanding that the form, construction and arrangement of the several parts herein illustrated and described may be changed within the limits of the claims hereto appended, without departing from the spirit of the invention as expressed in said claims.

Reference will be made to the accompanying drawing in which

Figure 1:
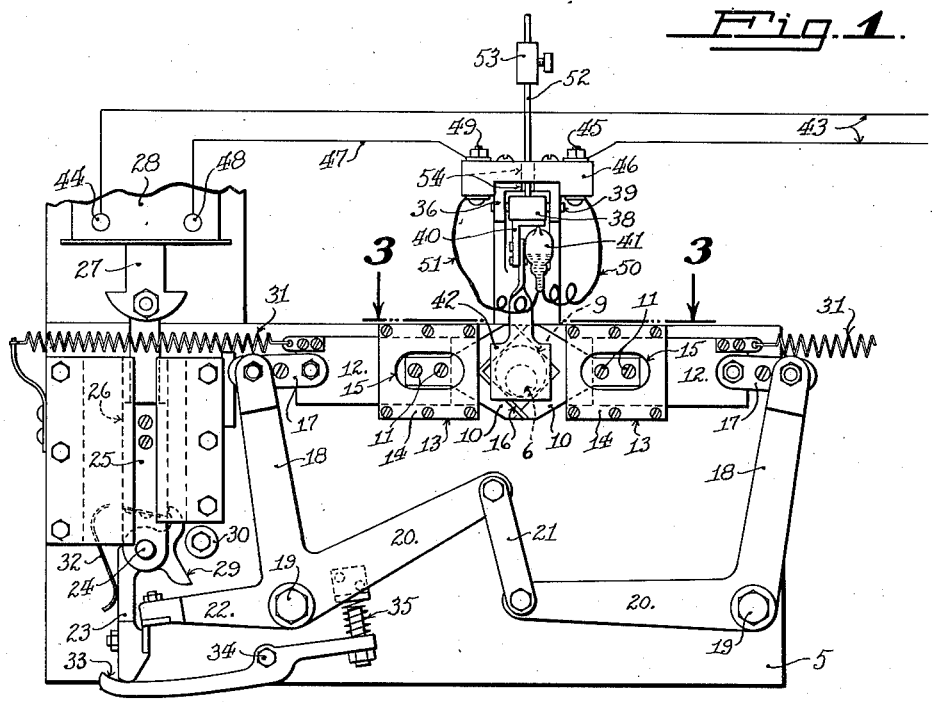
Fig. 1 is a front elevation as viewed from the advancing end of the strip of material to be cut.
Figure 3:
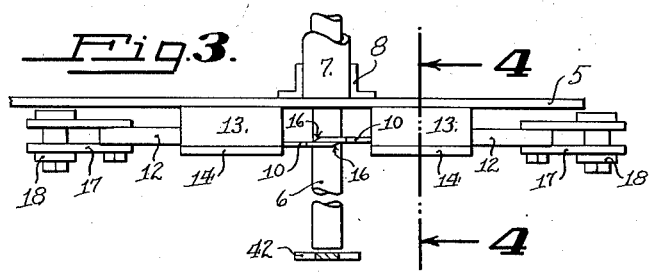
Fig. 3 is a part sectional plan of the cutting knives taken on the line 3—3 of Fig. 1, the switch mechanism being omitted.

In the drawing, the reference numeral 5 designates a vertically disposed supporting plate or frame upon which the entire mechanism is mounted. The continuously advancing strip of material 6, herein shown as cylindrical in cross section, passes through a guide tube 7 extending rearwardly from the plate 5 and connected therewith by a flange 8. The plate 5 has an aperture 9 in line with the end of said guide tube, as shown. A pair of oppositely operating cutting knives 10 are mounted for cooperative reciprocating movement in front of the plate 5. Each knife 10 is attached by screws 11 to a shank 12, the latter being slidably mounted in a guide 13 secured to the front of the plate 5. The guides 13 are provided with removable cover plates 14 in which are formed apertures 15 for access to the screws 11 which hold the knife blades 10 to their shanks 12. The blades 10 are preferably V-shaped, as shown, and overlapping to provide a shearing effect, and their cutting edges are sharpened by being beveled upon their outer or non-adjacent faces, as indicated at 16. However, blades of other shapes may be used if desired.

The shanks 12 of the knives are connected by links 17 with the upstanding arms 18 of respective bell cranks pivotally mounted at 19 upon the plate 5. As shown in Fig. 1, the bell cranks have substantially horizontal arms 20 extending toward each other, and said arms 20 are connected together by a link 21, so that the knife shanks 12 are interconnected for simultaneous movement in opposite directions.

One of the bell cranks, which happens to be that on the left, as viewed in Fig. 1, has a horizontal arm 22 whose end is engaged by a hook shaped link 23. The upper end of the link 23 is pivoted at 24 to a sliding block 25 which is mounted for vertical movement in guides 26, and is connected at its upper end with the armature 27 of a solenoid 28. Therefore, when the solenoid is energized and caused to pull its armature 27 upwardly, the hooked link 23 raises the arm 22 of the left hand bell crank, thus causing both knife blades to be moved inwardly simultaneously.

In order to cause the knife blades to be retracted immediately upon the conclusion of their inward cutting stroke, and to insure that said retraction will take place instantaneously even through there may be a delay in the releasing of the solenoid armature, I provide an automatic releasing mechanism to disconnect the arm 22 from the hooked link 23 at the end of the upward movement of the latter. The hooked link 23 has a cam extension 29 which strikes against a roller 30 mounted on a fixed pivot at the conclusion of its upward stroke, that is, at the instant that the knives 10 have completed their cutting operation. The contact between the cam extension 29 and the roller 30 swings the lower end of the hooked link 23 toward the left, thereby freeing it from engagement with the arm 22. The knives are thereupon retracted by springs 31. When the armature 27 again drops, the hooked link 23 is restored to engagement with the arm 22 by a spring 32, assisted by a cam 33 upon which the end of said link rides as it approaches the bottom of its stroke. The cam 33 is resiliently mounted by being pivoted at 34 and having a cushioning spring 35 to hold it in its normal upper position as shown.

The solenoid 28 is controlled by a switch, which in turn is operated by a trigger positioned for engagement by the end of the advancing strip of material 6. Any suitable form of switch may be used although I have herein shown, and prefer to employ, a mercury contact switch of well known type in which a small body of mercury is contained within a glass tube, the contact being made or broken by tilting the tube to cause the mercury to flow from one position to another.

Figure 2:
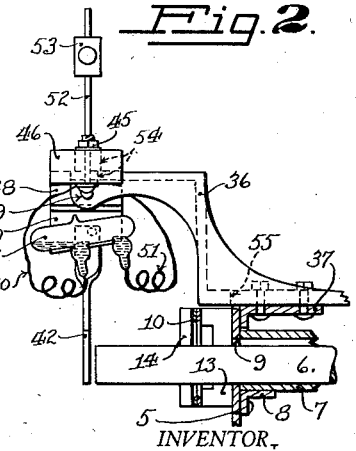
Fig. 2 is a detail partly in section and partly in elevation taken at right angles to the plane of Fig. 1, showing the switch for controlling the electrically operated cutting means.
Figure 4:
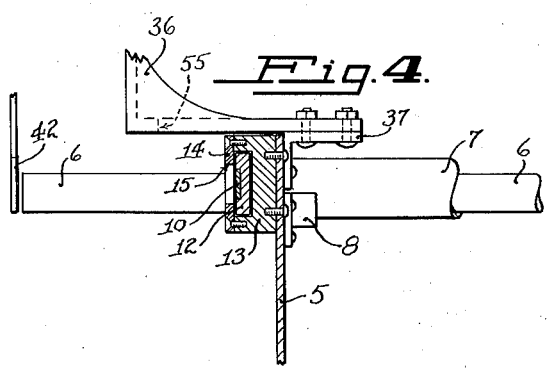
Fig. 4 is a section taken on the line 4—4 of Fig. 3.

The switch mechanism is carried by a bracket 36 bolted to another bracket 37 which is secured to the plate 5, the relation of these parts being more clearly revealed in Fig. 2. The bracket 36 extends upwardly and forwardly and carries a trunnion block 38 mounted for rocking movement about a pivot 39, as shown in Figs. 1 and 2. Secured to the block 38 is a depending arm 40 which carries the mercury contact tube 41. A trigger 42 is also secured to the arm 40 and extends downwardly into the path of the advancing strip 6 of material to be cut. Therefore, as said strip of material advances into contact with the trigger 42, it pushes the latter forwardly, thereby tilting the mercury tube 41 sufficiently to cause it to close its contacts, whereupon the solenoid 28 is energized and the knives 10 are operated to cut off the end portion of the strip 6. The cut portion thereupon drops into any suitable place of deposit, not shown, and the trigger 42 returns by gravity to its normal vertical position, thereby opening the switch contacts and releasing the solenoid. In the meantime, however, the knives 10 have been retracted, as previously described, so that even though there might be some slight delay in the dropping of the cut-off end portion of the strip of material and consequent delay in de-energizing the solenoid, the knives are immediately retracted out of the path of the advancing uncut portion of the strip.

The electrical connections of the switch and the solenoid are illustrated in Fig. 1, in which 43 are wires leading from a source of current, not shown, one wire being connected with the solenoid at 44, and the other with a connector 45 upon a block of insulating material 46 which is mounted upon the top of the bracket frame 36. A wire 47 leads from the other terminal 48 of the solenoid to another connector 49 on the insulating block 46. The flexible leads 50 and 51 from the mercury tube 41 are connected respectively with the connectors 45 and 49.

In order to prevent swinging or vibrating of the trigger 42 and the mercury tube upon their return movement, I provide an adjustable counterbalance to retard said movement. The counterbalance comprises a vertical rod 52 having its lower end screwed into the top of the trunnion block 38 and provided with an adjustable weight 53. By properly positioning the weight 53, the return swing of the trigger and the mercury tube can be so damped as to prevent any splashing or agitation of the mercury in said tube, which might cause it to make momentary contact at the wrong time. The top of the bracket 36 and the insulating block 46 are provided with slots as indicated at 54, through which the counterbalance rod 52 extends for free swinging movement.

In order to provide for varying the length of the cut pieces, the bracket 36 is adjustable to move the trigger 42 toward or away from the knives 10. For this purpose, the connection between the bracket 36 and the bracket 37 is a slotted one, as indicated at 55, the bolts which hold said brackets together operating in said slot to permit adjustment of the bracket 36 toward the front or rear.

I claim:—

1. Mechanism for automatically cutting successive pieces from the end of a continuously advancing strip comprising a knife movable across the path of said strip, means controlled by the advancing strip for actuating said knife, means for releasing said knife from said actuating means at the end of its cutting stroke, and other means for retracting said knife.

2. Mechanism for automatically cutting successive pieces from the end of a continuously advancing strip comprising a knife movable across the path of said strip, a trigger positioned to be engaged and moved by the advancing end of said strip, a switch operated by said trigger, electromagnetic means controlled by said switch for moving said knife to cut off the end portion of said strip, means for rendering said electromagnetic means inoperative with respect to said knife immediately upon completion of said cutting movement, and means for returning said knife to its original position.

3. Mechanism for automatically cutting successive pieces from the end of a continuously advancing strip comprising a knife movable across the path of said strip, means for actuating said knife to cut said strip, means for releasing said knife from said actuating means upon the completion of its cutting stroke, and other means for retracting said knife.

4. Mechanism for automatically cutting successive pieces from the end of a continuously advancing strip comprising a knife movable across the path of said strip, means for actuating said knife to cut said strip, means for releasing said knife from said actuating means upon the completion of its cutting stroke, auxiliary means for retracting said knife, and means for re-engaging said actuating means with said knife upon the completion of its retracting stroke.

5. Mechanism for automatically cutting successive pieces from the end of a continuously advancing strip comprising a pair of cooperating knives mounted for simultaneous opposite movement to cut said strip, means for actuating said knives upon their cutting stroke, means for releasing said knives from said actuating means upon completion of their cutting strokes, and auxiliary means for retracting said knives upon completion of said cutting stroke said auxiliary means operating independently of the subsequent movement of said actuating means.

6. Mechanism for automatically cutting successive pieces from the end of a continuously advancing strip comprising a pair of cooperating knives having V-shaped overlapping blades mounted for simultaneous opposite movement to cut said strip, means for actuating said knives upon their cutting stroke, means for releasing said knives from said actuating means upon completion of their cutting stroke, and auxiliary means for retracting said knives upon completion of said cutting stroke, said auxiliary means operating independently of the subsequent movement of said actuating means.

7. Mechanism for automatically cutting successive pieces from the end of a continuously advancing strip comprising a knife movable across the path of said strip, means for actuating said knife to cut said strip, a connection between said actuating means and said knife including a hooked link, means for moving said link laterally to break said connection at the end of the cutting stroke of said knife, and means for retracting said knife when disengaged from said actuating means.

8. Mechanism for automatically cutting successive pieces from the end of a continuously advancing strip comprising a knife movable across the path of said strip, means for actuating said knife to cut said strip, a connection between said actuating means and said knife including a hooked link, means for moving said link laterally to break said connection at the end of the cutting stroke of said knife, means for retracting said knife independently of the return movement of said actuating means, and means for restoring said link to its engaged position upon completion of said return movement.

JOHN KRUTTSCHNITT.